(12) United States Patent
Yoshida et al.

(10) Patent No.: US 8,342,287 B2
(45) Date of Patent: Jan. 1, 2013

(54) VEHICLE STEERING APPARATUS

(75) Inventors: Kouya Yoshida, Toyota (JP); Nobuhiro Uchida, Toyota (JP)

(73) Assignee: JTEKT Corporation, Osaka (JP)

( * ) Notice: Subject to any disclaimer, the term of this patent is extended or adjusted under 35 U.S.C. 154(b) by 192 days.

(21) Appl. No.: 12/867,488

(22) PCT Filed: Feb. 10, 2009

(86) PCT No.: PCT/JP2009/000529
§ 371 (c)(1),
(2), (4) Date: Aug. 12, 2010

(87) PCT Pub. No.: WO2009/101794
PCT Pub. Date: Aug. 20, 2009

(65) Prior Publication Data
US 2010/0320026 A1     Dec. 23, 2010

(30) Foreign Application Priority Data
Feb. 12, 2008  (JP) ................................ 2008-031109

(51) Int. Cl.
*B62D 5/04*  (2006.01)
(52) U.S. Cl. ........................................ 180/444; 180/446
(58) Field of Classification Search ................ 180/444, 180/446
See application file for complete search history.

(56) References Cited

U.S. PATENT DOCUMENTS

| | | | |
|---|---|---|---|
| 5,732,790 A | 3/1998 | Endo et al. | |
| 5,810,111 A | 9/1998 | Takeuchi et al. | |
| 7,967,087 B2 * | 6/2011 | Arulraja et al. | 180/9.5 |
| 2002/0060105 A1 | 5/2002 | Tominaga et al. | |
| 2004/0060766 A1 | 4/2004 | Hayakawa et al. | |
| 2006/0108884 A1 | 5/2006 | Shiino et al. | |
| 2009/0120712 A1 * | 5/2009 | Kashimoto et al. | 180/444 |
| 2011/0303470 A1 * | 12/2011 | Hall | 180/9.1 |

FOREIGN PATENT DOCUMENTS

| | | |
|---|---|---|
| JP | 8-188164 A | 7/1996 |
| JP | 8-258730 A | 10/1996 |
| JP | 2000-190856 A | 7/2000 |
| JP | 2002-120739 A | 4/2002 |
| JP | 2003-182606 A | 7/2003 |
| JP | 2004-009896 A | 1/2004 |
| JP | 2004-131047 A | 4/2004 |
| JP | 2006-168705 A | 6/2006 |

OTHER PUBLICATIONS

English translation of the foreign Office Action issued on Sep. 20, 2012.

* cited by examiner

*Primary Examiner* — Ruth Ilan
*Assistant Examiner* — Marlon Arce
(74) *Attorney, Agent, or Firm* — Rabin & Berdo, P.C.

(57) ABSTRACT

A vehicle steering apparatus (1) comprises: a control device (12) which controls an actuation of an electric motor (18); a control housing (H) which partitions an accommodation chamber (100) which accommodates the control device (12); an adjacent housing (27, 28; 280; 35A) which is adjacent to the control housing (H); and a heat-conducting member (96; 96A; 96B; 96C; 96D; 96E). The adjacent housing (27, 28; 280; 35A) is opposite to the electric motor (18) with the control housing (H) interposed therebetween. The heat-conducting element (96; 96A; 96B; 96C; 96D; 96E) comprises: an adjacent section (97) which is adjacent to a heat-generating element (83) of the control device (12) so that heat can be conducted; and a connected section (98; 98A; 98B; 98C; 98D; 98E) that is connected to the adjacent housing (27, 28; 280; 35A) so that heat can be conducted.

10 Claims, 9 Drawing Sheets

VEHICLE STEERING APPARATUS

TECHNICAL FIELD

The present invention relates to a vehicle steering apparatus.

BACKGROUND ART

Electric power steering apparatus serving as vehicle steering apparatus assist drivers in steering by electric motors. More specifically, various types of sensors and others detect the steering states of steering members, for example, and control devices control electric motors based on the results of the detection of the steering states so that steering assist forces are applied to steering mechanisms.

On the other hand, it is proposed that a control device is arranged between an electric motor and a speed reduction mechanism in an axial direction of the electric motor (see, e.g., Patent Document 1).

In an electric power steering apparatus in Patent Document 1, a common case is interposed between a motor housing and a gear housing. A motor chamber is defined between the case and the motor housing, and a controller accommodation chamber is defined between the case and the gear housing.

[Patent Document 1] JP 2000-190856 A

DISCLOSURE OF THE INVENTION

Problems to be Solved by the Invention

In the electric power steering apparatus in Patent Document 1, a control device is attached along an interior wall surface on the motor side within the controller accommodation chamber. The electric motor usually tends to have heat, and the control device is arranged closer to the electric motor. Therefore, heat from a heat generation element in the control device is not easily released outward.

Means for Solving the Problems

The present invention is directed to providing a vehicle steering apparatus that is small in size and is superior in heat radiation properties.

According to an aspect of the present invention, a vehicle steering apparatus includes a control device that includes a heat generation element and controls the driving of an electric motor, a control housing that partitions an accommodation chamber that contains the control device, an adjacent housing that is opposite to the electric motor with the control housing sandwiched therebetween and is adjacent to the control housing, and a heat-conducting member, in which the heat-conducting member includes a proximity section in close proximity to the heat generation element in the control device so that heat can be conducted, and a connected section that is connected to the adjacent housing so that heat can be conducted.

According to the aspect, heat from the heat generation element in the control device is radiated via the heat-conducting member to not a housing that houses the electric motor that generates heat but the adjacent housing that is opposite to and adjacent to the electric motor, thereby enabling heat radiation properties to be significantly improved. Therefore, a heat sink, for example, can be miniaturized, and thus the vehicle steering apparatus is small in size and have superior heat radiation properties.

A member having a high coefficient of thermal conductivity, such as aluminum or copper, can be used as the heat-conducting member. When aluminum is used as the heat-conducting member, the heat-conducting member and the adjacent housing can be integrally formed of a single material. A heat pipe, and a heat-conducting structural material using a heat pipe (e.g., a heat lane obtained by folding the heat pipe) can also be used as the heat-conducting member.

The control housing may include first and second interior wall surfaces that are opposite to each other in an axial direction of a rotatable shaft in the electric motor, the first and second interior wall surfaces may partially partition the accommodation chamber, the first interior wall surface may be arranged relatively closer to the electric motor, and the second interior wall surface may be arranged relatively farther from the electric motor, the heat generation element in the control device may be mounted on a power substrate attached to the second interior wall surface so that heat can be conducted, and the proximity section in the heat-conducting member may be connected to a heat sink connecting to the second interior wall surface so that heat can be conducted In this case, the power substrate on which the heat generation element such as a switching element is mounted is attached to the second interior wall surface closer to the adjacent housing so that heat can be conducted. Heat from the heat generation element can be efficiently released to the adjacent housing via the power substrate, the heat sink connecting to the second interior wall surface, and the heat-conducting member, thereby enabling heat radiation properties to be improved. Therefore, the heat sink can be made as small as possible, and thus the vehicle steering apparatus can be miniaturized.

The vehicle steering apparatus may further include a transmission mechanism that houses a transmission mechanism for transmitting power of the electric motor to a steering mechanism, in which the adjacent housing may include a housing provided in the transmission mechanism housing. The control device usually includes the heat generation element such as a switching element mounted on the power substrate. On the other hand, the transmission mechanism hardly generates heat. Heat from the heat generation element can be effectively released from the interior of the accommodation chamber to the outside via the housing that houses the transmission mechanism.

The transmission mechanism may include a driving member and a driven member that is driven by the driving member, the transmission mechanism housing may include a cylindrical driven member housing that houses the driven member, and the connected section in the heat-conducting member may be along at least one of an outer peripheral surface and an end surface of the driven member housing. If the cylindrical driven member housing houses the driven member that becomes larger in size than the driving member, a sufficient heat radiation area can be ensured, thereby enabling heat radiation properties to be significantly improved.

The vehicle steering apparatus may further include a steering state detecting sensor for detecting a steering state, in which the adjacent housing may include a sensor housing that houses the steering state detecting sensor. In this case, heat from the heat generation element such as a switching element can be effectively released from the interior of the accommodation chamber to the outside via the sensor housing that houses the steering state detecting sensor.

At least a part of the heat-conducting member may be arranged between the control housing and the adjacent housing because the length of a heat-conducting path can be reduced.

The control device may be arranged around a central axis of the rotatable shaft in the electric motor or an extension of the central axis. In this case, a space in the accommodation chamber can be effectively used to arrange the control device, and thus the vehicle steering apparatus can be made smaller in size in the axial direction of the rotatable shaft in the electric motor.

The heat-conducting member may include a member that extends in a predetermined length L toward the adjacent housing from the control housing, and letting A be the cross-sectional area of the member extending in the predetermined length L, ρ be the coefficient of thermal conductivity of the member extending in the predetermined length L, and B be the average loss of the heat generation element, the following equation may hold:

$$(A^2/L) < (1/\rho) \cdot B$$

In this case, the cross-sectional area A of the accommodation member extending in the predetermined length L and the length L can be designed to optimum set values at which sufficient heat conduction and heat radiation can be exhibited.

DESCRIPTION OF SYMBOLS

Figure 1:
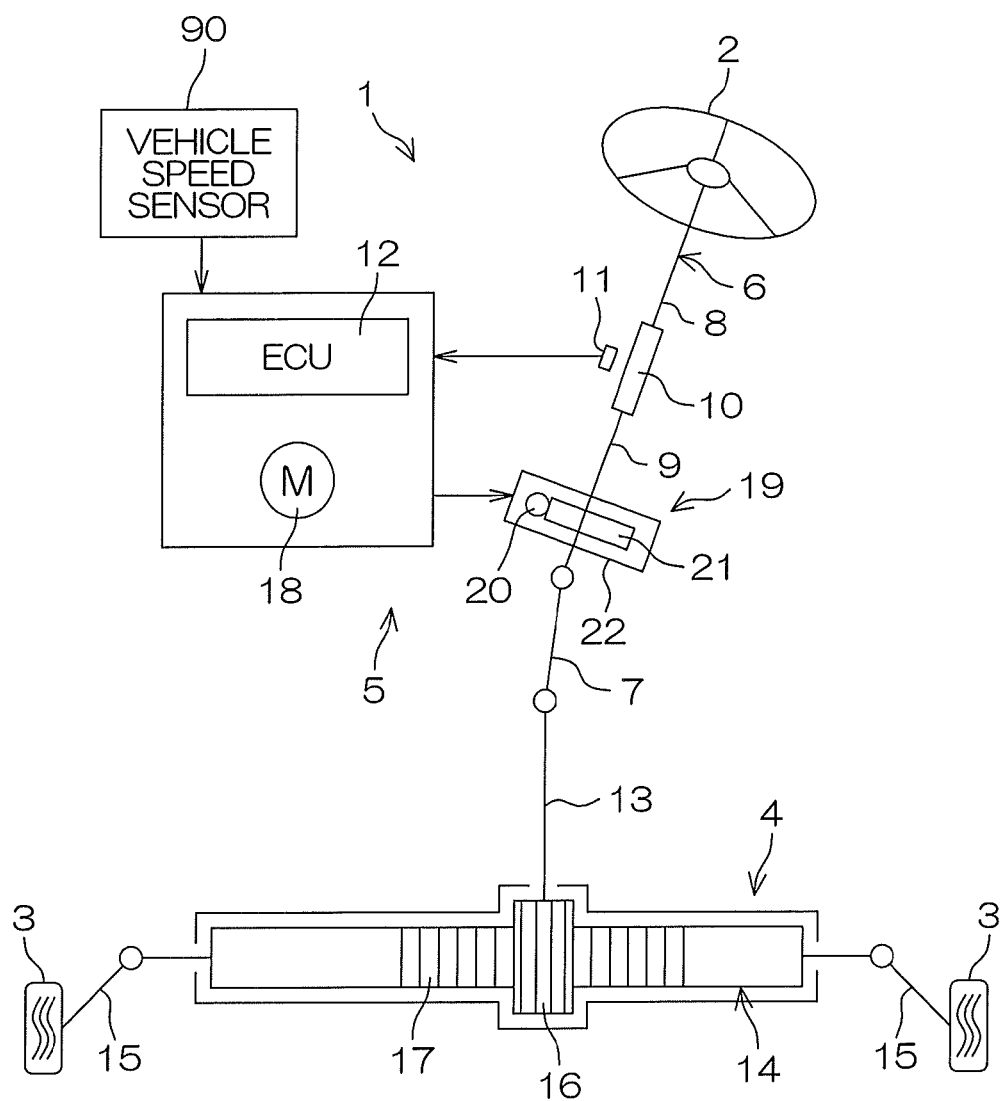
FIG. 1 is a schematic view illustrating the schematic configuration of an electric power steering apparatus serving as a vehicle steering apparatus according to an embodiment of the present invention.

1 . . . electric power steering apparatus (vehicle steering apparatus), 4 . . . steering mechanism, 5 . . . steering assist mechanism, 6 . . . steering shaft, 11 . . . torque sensor (steering state detecting sensor), 12 . . . ECU (control device), 18 . . . electric motor, 19 and 19A . . . speed reduction mechanism (transmission mechanism), 20 . . . worm shaft (driving member), 20A . . . driving member, 21 . . . worm wheel (driven member), 21A . . . driving member, 22 and 22A . . . gear housing (housing that houses transmission mechanism), 23 . . . first housing, 24 and 24A . . . second housing, 25 . . . motor housing, 26 . . . motor housing main body, 27 . . . driving gear housing (driving member housing, adjacent housing), 28 and 280 . . . driven gear housing (driven member housing, adjacent housing), 281 . . . end surface, 282 . . . outer peripheral surface, 35A . . . sensor housing (housing that houses steering state detecting sensor, adjacent housing), 37 . . . rotatable shaft, 70 . . . motor chamber, 78 . . . power substrate, 79 . . . control substrate, H . . . control housing, 100 . . . accommodation chamber, 101 . . . first interior wall surface, 102 . . . second interior wall surface, 96, 96A, 96B, 96C, 96D, and 96E . . . heat-conducting member, 97 . . . proximity section, 98, 98A, 98B, 98C, 98D, 98E . . . connected section, 123 . . . heat sink, C1 . . . central axis (of rotatable shaft), C2 . . . extension line, C4 . . . central axis (of driven member), X1 . . . axial direction (of rotatable shaft), A . . . cross-sectional area, B . . . average loss, L . . . predetermined length.

BEST MODE FOR CARRYING OUT THE INVENTION

Referring to the drawings, embodiments of the present invention will be specifically described.

FIG. 1 is a schematic view illustrating the schematic configuration of an electric power steering apparatus 1 serving as a vehicle steering apparatus according to an embodiment of the present invention.

Referring to FIG. 1, the electric power steering apparatus 1 includes a steering wheel 2 serving as a steering member, a steering mechanism 4 for steering steerable wheels 3 in synchronization with the rotation of the steering wheel 2, and a steering assist mechanism 5 for assisting a driver in steering. The steering wheel 2 and the steering mechanism 4 are mechanically connected to each other via a steering shaft 6 and an intermediate shaft 7.

Although in the present embodiment, the steering assist mechanism 5 applies an assist force (a steering assist force) to the steering shaft 6, the present invention can be applied to a configuration in which the steering assist mechanism 5 applies a assist force to a pinion shaft, described below, and a configuration in which the steering assist mechanism 5 applies an assist force to a rack shaft, described below.

The steering shaft 6 linearly extends. The steering shaft 6 includes an input shaft 8 connected to the steering wheel 2 and an output shaft 9 connected to an intermediate shaft 7. The input shaft 8 and the output shaft 9 are coaxially connected to each other relatively rotatably via a torsion bar 10. More specifically, when a steering torque having a predetermined value or more is input to the steering wheel 2, the input shaft 8 and the output shaft 9 rotate in the same direction while rotating relative to each other.

A torque sensor 11 serving as a steering state detecting sensor arranged around the steering shaft 6 detects a steering torque input to the steering wheel 2 based on an amount of relative rotational displacement of the input shaft 8 and the output shaft 9. The result of the torque detection by the torque sensor 11 is input to an electronic control unit (ECU) 12 serving as a control device. The result of vehicle speed detection from a vehicle speed sensor 90 is input to the ECU 12.

The intermediate shaft 7 connects the steering shaft 6 and the steering mechanism 4 to each other. The steering mechanism 4 is composed of a rack-and-pinion mechanism including a pinion shaft 13 and a rack shaft 14 serving as a steered shaft. The steerable wheel 3 is connected to each of ends of the rack shaft 14 via a tie rod 15 and a knuckle arm (not illustrated).

The pinion shaft 13 is connected to the intermediate shaft 7. The pinion shaft 13 rotates together with the steering of the steering wheel 2. A pinion 16 is provided at a tip end (a lower end in FIG. 1) of the pinion shaft 13.

The rack shaft 14 linearly extends in a right-and-left direction of an automobile. A rack 17, which meshes with the pinion 16, is formed halfway in an axial direction of the rack shaft 14. The pinion 16 and the rack 17 convert the rotation of the pinion shaft 13 into the axial movement of the rack shaft 14. The rack shaft 14 is moved in the axial direction so that the steerable wheels 3 can be steered.

When the steering wheel 2 is steered (rotated), the rotation is transmitted to the pinion shaft 13 via the steering shaft 6 and the intermediate shaft 7. The pinion 16 and the rack 17 convert the rotation of the pinion shaft 13 into the axial movement of the rack shaft 14. Thus, the steerable wheels 3 are steered.

The steering assist mechanism 5 includes an electric motor 18 for steering assist and a speed reduction mechanism 19 serving as a transmission mechanism for transmitting an output torque of the electric motor 18 to the steering mechanism 4. Examples of the speed reduction mechanism 19 include a skew gear mechanism such as a worm gear mechanism and a parallel gear mechanism. In the present embodiment, the worm gear mechanism is used as the speed reduction mechanism 19. More specifically, the speed reduction mechanism 19 includes a worm shaft 20 serving as a driving gear (a member that drives the transmission mechanism) and a worm wheel 21 serving as a driven gear (a member that is driven by the transmission mechanism), which meshes with the worm shaft 20. The speed reduction mechanism 19 is housed in a gear housing 22 serving as a transmission mechanism housing.

The worm shaft 20 is connected to a rotatable shaft (not illustrated) in the electric motor 18 via a joint (not illustrated). The electronic motor 18 drives to rotate the worm shaft 20. The worm wheel 21 is connected to the steering shaft 6 together rotatably. The worm shaft 20 drives to rotate the worm wheel 21.

When the electric motor 18 drives to rotate the worm shaft 20, the worm shaft 20 drives to rotate the worm wheel 21, and the worm wheel 21 and the steering shaft 6 together rotate. The rotation of the steering shaft 6 is transmitted to the pinion shaft 13 via the intermediate shaft 7. The rotation of the pinion shaft 13 is converted into the axial movement of the rack shaft 14. Thus, the steerable wheels 3 are steered. More specifically, the electric motor 18 drives to rotate the worm shaft 20 so that the steerable wheels 3 are steered.

The electric motor 18 is controlled by the ECU 12. The ECU 12 controls the electric motor 18 based on the result of torque detection from the torque sensor 11, the result of vehicle speed detection from the vehicle speed sensor 90, and so on. More specifically, the ECU 12 carries out control to use a map storing for each vehicle speed a relationship between a torque and a target assist amount to determine the target assist amount and bring an assist force generated by the electric motor 18 closer to the target assist amount.

Figure 2:
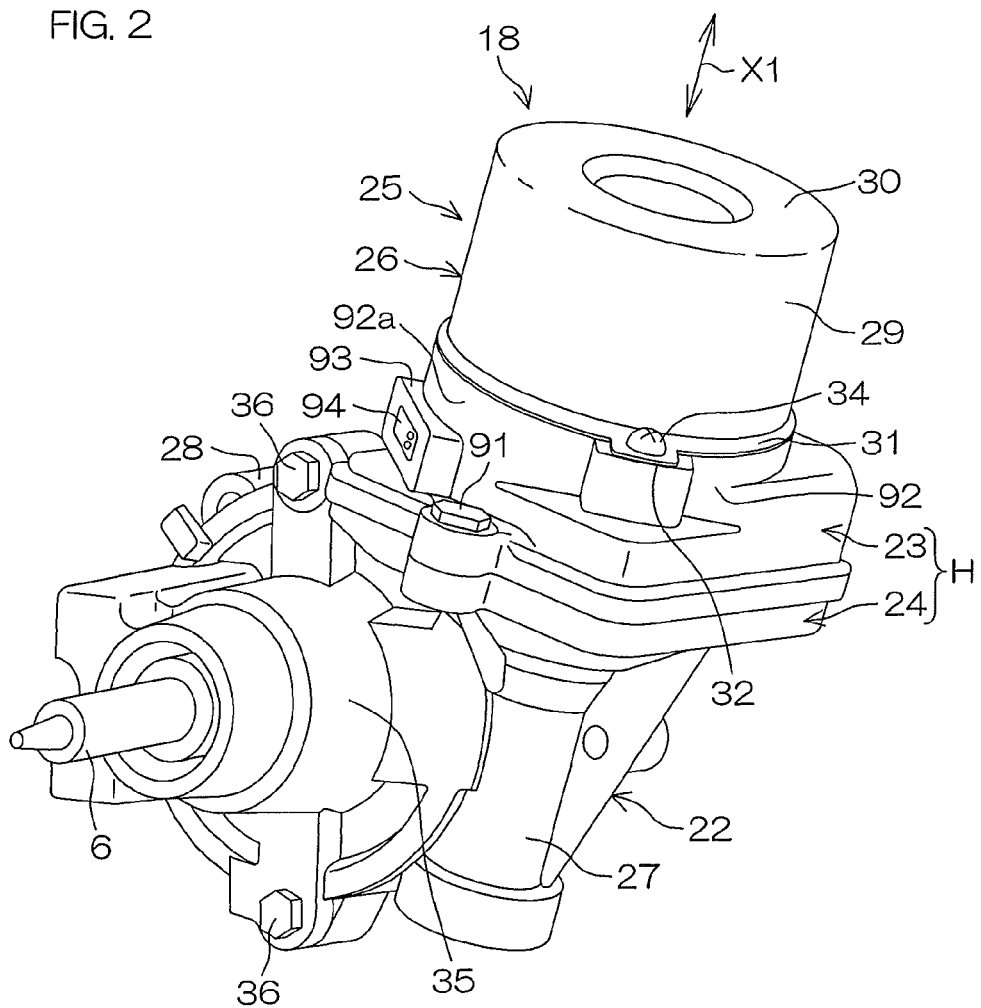
FIG. 2 is a schematic perspective view of a steering assist mechanism.
Figure 3:
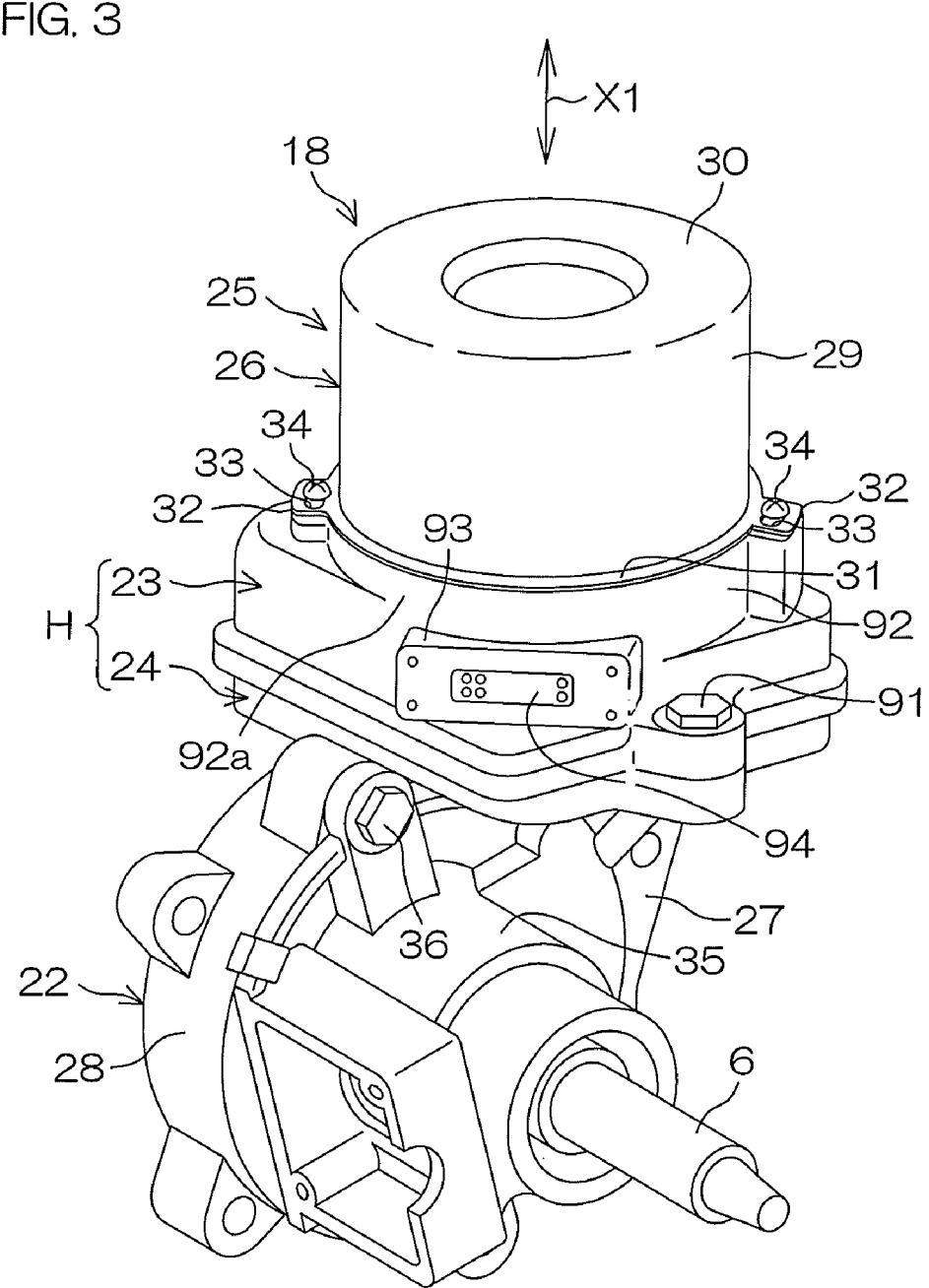
FIG. 3 is a schematic perspective view of the steering assist mechanism, as viewed from an angle different from that illustrated in FIG. 2.

FIGS. 2 and 3 are respectively schematic perspective views of the steering assist mechanism 5, as viewed from different angles. The present embodiment is mainly characterized in that a control housing H for housing the above-mentioned ECU 12 serving as the control device includes a first housing 23 and a second housing 24, which contact each other (e.g., a state where their respective end surfaces abut on each other or a state where their respective ends are fitted to each other), as illustrated in FIGS. 2 and 3.

More specifically, the first housing 23 and the second housing 24, which constitute the control housing H for housing the ECU 12, are in contact with each other. More specifically, the first housing 23 and the second housing 24 directly engage with each other, and no other housing is interposed between both the housings 23 and 24. This results in significant miniaturization.

Each of the first housing 23 and the second housing 24 is formed in a substantially square box shape whose one end opens. The respective ends of the first and second housings 23 and 24 abut on each other, and are fastened to each other by a fixing screw 91.

On the other hand, a motor housing 25 in the electric motor 18 includes a cylindrical motor housing main body 26 and the above-mentioned first housing 23. More specifically, the first housing 23 that is a part of the control housing H for housing the ECU 12 is formed of a single material integrally with at least a part of the motor housing 25 in the electric motor 12. In other words, at least a part of the motor housing 25 and a part of the control housing H for housing the ECU 12 are combined with each other.

The gear housing 22 includes a driving gear housing 27 serving as a cylindrical driving member housing that houses the worm shaft 20, a driven gear housing 28 serving as a cylindrical driven member housing that houses the worm wheel 21, and the above-mentioned second housing 24. More specifically, the second housing 24 that is a part of the control housing H for housing the ECU 12 is formed of a single material integrally with the driving gear housing 27 and the driven gear housing 28 in the gear housing 22. In other words, a part of the gear housing 22 and a part of the control housing H for housing the ECU 12 are combined with each other.

A cylindrical projection 93 is formed on the outer periphery 92a of an outer peripheral wall 92 serving as a sidewall of the first housing 23, and an electric connector 94 facing the outside of the first housing 23 is arranged within the cylindrical projection 93. The electric connector 94 is provided with a terminal for supplying power from a battery to the ECU 12 or a terminal for inputting and outputting a signal from the exterior, which is not illustrated.

Figure 4:
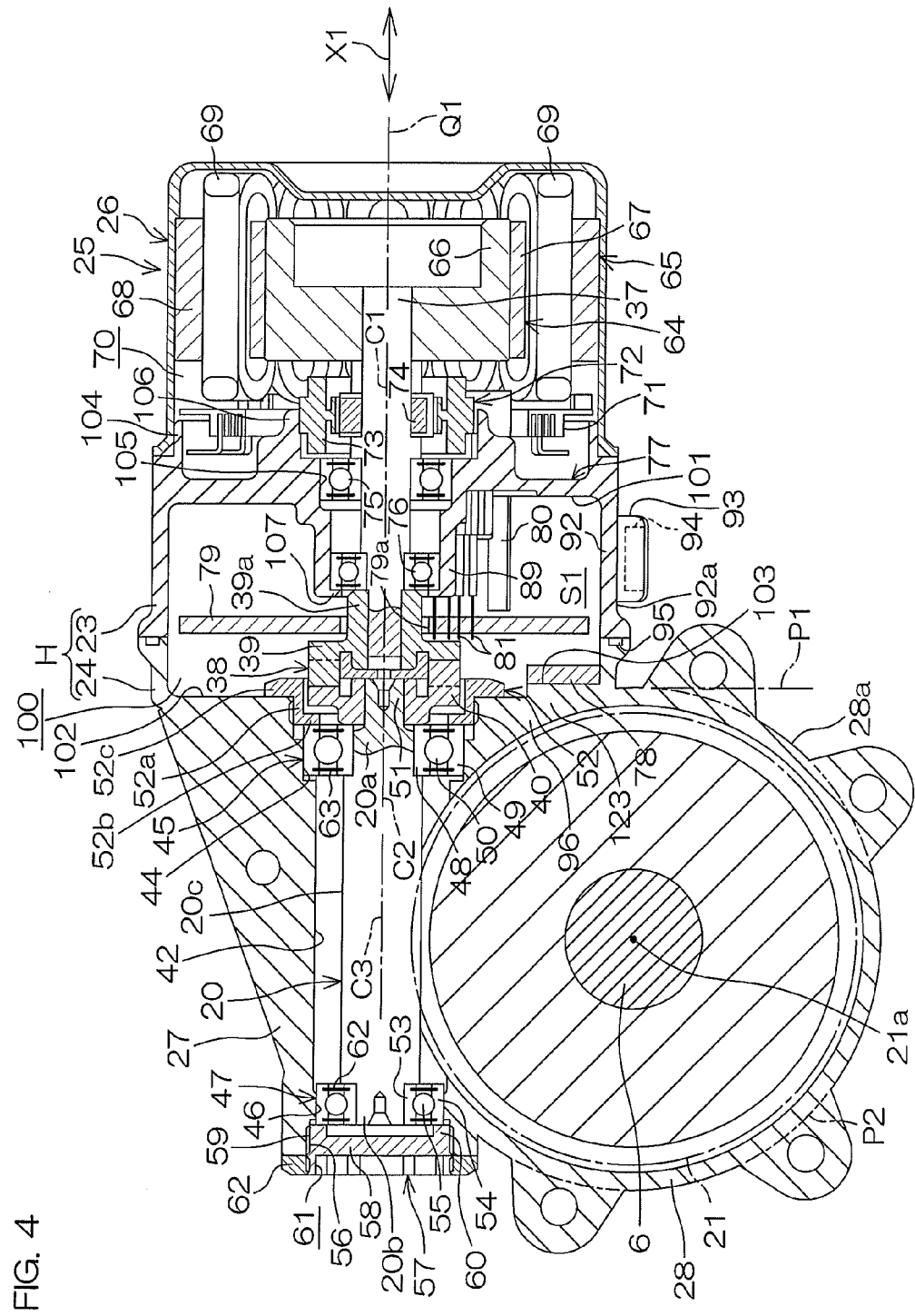
FIG. 4 is an illustrative sectional view of the steering assist mechanism, cut in an axial direction of an electric motor.

Referring to FIG. 4, which is a cross-sectional view of a principal part of the electric power steering apparatus 1, the worm wheel 21 serving as a driven member of the speed reduction mechanism 19 (transmission mechanism) and the electric connector 94 are arranged on the same side of a plane Q1 including a central axis C3 of the worm shaft 20 serving as a driving member of the speed reduction mechanism 19 (transmission mechanism) and parallel to a central axis 21a of the worm wheel 21. In this case, the electric connector 94 and the driven gear housing 28 project toward the same side, as viewed in an axial direction X1 of a rotatable shaft 37 in the electric motor 18. This enables substantial miniaturization and space saving, resulting in improvement in properties for loading in a vehicle.

Referring to FIG. 3, the electric power steering apparatus 1 is laid out so that at least respective parts of the electric connector 94 and the driven gear housing 28 overlap each other, as viewed in the axial direction X1 of the rotatable shaft 37, described below, in the electric motor 18. This enables substantial miniaturization and space saving, resulting in improvement in properties for loading in the vehicle.

The electric power steering apparatus 1 is laid out so that at least respective parts of the electric connector 94 and a sensor housing 35 overlap each other, as viewed in the axial direction X1 of the rotatable shaft 37. This enables substantial miniaturization and space saving, resulting in improvement in properties for loading in the vehicle.

The first housing 23 in the motor housing 25 is formed of an aluminum alloy (e.g., a casting or a cold forging), so that the steering assist mechanism 5 is made lightweight. The gear housing 22 including the driving gear housing 27, the driven gear housing 28, and the second housing 24 is formed of an aluminum alloy (e.g., a casting or a cold forging), for example, so that the steering assist mechanism 5 is made lightweight. A non-magnetic sheet metal, for example, is used for the motor housing main body 26 in the motor housing 25.

The motor housing main body 26 includes a cylindrical peripheral wall 29, a bottom wall 30 for closing one end of the peripheral wall 29, and an annular flange 31 that protrudes radially outward from the other end of the peripheral wall 29.

A bracket 32 that protrudes radially outward from a part in a circumferential direction of the annular flange 31. A fixing screw 34 inserted through a screw insertion hole 33 in the bracket 32 is screwed into a screw hole in the first housing 23 so that the motor housing main body 26 and the first housing 23 are integrally fixed to each other. The screw insertion hole 33 is formed into a long hole extending in a circumferential direction of the motor housing main body 26 so that a position in the circumferential direction of the motor housing main body 26 can be adjusted for the first housing 23.

The first housing 23 and the second housing 24, which constitute the control housing H for housing the ECU 12, are fixed to each other using a fixing screw 91.

A cylindrical sensor housing 35 that houses the torque sensor 11 is connected to the driven gear housing 28 in the gear housing 22. The driven gear housing 28 and the sensor housing 35 are fixed to each other using a fixing screw 36. The steering shaft 6 is inserted through the cylindrical driven gear housing 28 and the sensor housing 35.

Referring to FIG. 4, the first housing 23 serving as the motor housing 25 in the electric motor 18 and the second housing 24 that contacts the first housing 23 constitute an accommodation chamber 100 that accommodates the ECU 12 serving as the control device. The respective end surfaces of the first housing 23 and the second housing 24 abut on each other, and an annular sealing member 95 seals an area between the end surfaces.

The first housing 23 includes a first interior wall surface 101 for partially partitioning the accommodation chamber 100, and the second housing 24 includes a second interior wall surface 102 for partially partitioning the accommodation chamber 100. The first interior wall surface 101 and the second interior wall surface 102 are opposite to each other in the axial direction X1 of the rotatable shaft 37 in the electric motor 18.

The second interior wall surface 102 in the second housing 24 includes an annular plane, and the annular plane is perpendicular to a central axis C1 of the rotatable shaft 37 in the electric motor 18 or an extension C2 of the central axis C1 (usually matched with the central axis C3 of the worm shaft 20) and surrounds the central axis C1 or the extension C2. A flat seat section 103 that projects toward the accommodation chamber 100 more greatly than the annular plane is formed on the second interior wall surface 102, and the bottom of the seat section 103 is a thick-walled heat sink 123. A power substrate 78 is received by the seat section 103 in the second interior wall surface 102 so that heat can be conducted. A power circuit for driving the electric motor 18 is mounted on the power substrate 78. The power circuit includes a switching element such as a field effect transistor (FET) serving as a heat generation element.

An extension surface P1 of the seat section 103 in the second interior wall surface 102 contacts, as illustrated in FIG. 4, or intersects a cylindrical surface P2 formed of a principal part of an outer peripheral surface 28a of the cylindrical driven gear housing 28 serving as an adjacent housing that is adjacent to the control housing H.

The ECU 12 serving as the control device is arranged around the central axis C1 of the rotatable shaft 37 or the extension C2.

The rotatable shaft 37 in the electric motor 18 and the worm shaft 20 are coaxially arranged. The rotatable shaft 37 and the worm shaft 20 are coaxially connected to each other so that power can be transmitted via a joint 38 interposed therebetween. The joint 38 includes an annular input member 39 that rotates together with the rotatable shaft 37 in the electric motor 18, an annular output member 40 that rotates together with the worm shaft 20, and an annular elastic member 41 interposed between the input member 39 and the output member 40 for connecting the input member 39 and the output member 40 to each other so that power can be transmitted.

The worm shaft 20 is housed in a driving gear housing hole 42 in the driving gear housing 27 in the gear housing 22. The worm shaft 20 has a first end 20a and a second end 20b, and a worm 20c is formed in an intermediate portion in the axial direction of the worm shaft 20.

The first end 20a of the worm shaft 20 is rotatably supported by a first bearing 45 held in a bearing holding section 44 on the inner periphery at one end (an end on the side of the electric motor 18) of the driving gear housing hole 42. The second end 20b of the worm shaft 20 is rotatably supported by a second bearing 47 held in a bearing holding section 46 on the inner periphery at the other end of the driving gear housing hole 42.

The first bearing 45 is composed of a rolling bearing including an inner ring 48, an outer ring 49, and a plurality of rolling elements 50 interposed between the inner ring 48 and the outer ring 49. The inner ring 48 is held in the first end 20a of the worm shaft 20 together rotatably. One end surface of the inner ring 48 abuts on a positioning step provided on the outer periphery of the worm shaft 20. A small-diameter projection shaft 51 is provided to extend at the first end 20a of the worm shaft 20. The output member 40 in the joint 38 is fitted in the projection shaft 51 together rotatably and axially unmovably. The output member 40 abuts on the other end surface of the inner ring 48. The inner ring 48 is sandwiched between the positioning step in the worm shaft 20 and the output member 40. Thus, the axial movement of the inner ring 48 relative to the worm shaft 20 is regulated.

One end surface of the outer ring 49 is spaced a predetermined distance apart from and is opposite to a step adjacent to one side of the bearing holding section 44 in the driving gear housing hole 42. An annular fixing member 52 is screwed into a screw section adjacent to the other side of the bearing holding section 44 in the driving gear housing hole 42. The fixing member 52 presses the other end surface of the outer ring 49. Thus, the axial movement of the outer ring 49 is regulated. The fixing member 52 includes a cylindrical main body 52a having a screw section formed on its outer periphery, an inner flange 52b extending radially inward from one end of the main body 52a, and an outer flange 52c extending radially outward from the other end of the main body 52a. The inner flange 52b presses the other end surface of the outer ring 49. The outer flange 52c is pressed against the second interior wall surface 102 in the second housing 24 that partitions the accommodation chamber 100 that contains the ECU 12. This enables locking of the fixing member 52.

A part of the joint 38 is housed in the cylindrical main body 52a in the fixing member 52. Thus, the electric power steering apparatus 1 is miniaturized in the axial direction X1 of the rotatable shaft 37.

The second bearing 47 is composed of a rolling bearing including an inner ring 53, an outer ring 54, and a plurality of rolling elements 55 interposed between the inner ring 53 and the outer ring 54. The inner ring 53 is held in the second end 20b of the worm shaft 20 together rotatably. One end surface of the inner ring 53 abuts on a positioning step provided on the outer periphery of the worm shaft 20. Thus, the axial movement of the inner ring 53 relative to the worm shaft 20 (the movement toward the first bearing 45) is regulated.

A screw section 56 is formed in an inlet of the driving gear housing hole 42 that is adjacent to the bearing holding section 46 in the driving gear housing hole 42, and a preload applying member 57 for collectively applying a preload to the first and second bearings 45 and 47 is screwed into the screw section 56. The preload applying member 57 has a disk-shaped main body 58, and a screw section 59, which is screwed into the screw section 56, is formed on the outer periphery of the main body 58. An annular projection 60 for pressing one end surface of the outer ring 54 in the second bearing 47 is formed on one end surface of the main body 58.

A tool engagement hole 61, having a polygonal shape in cross section, for example, which engages with a tool for rotating the preload applying member 57 is formed on the other end surface of the main body 58. The preload applying member 57 is fixed by a lock nut 62, which is screwed into the screw section 59 in the main body 58.

Both the first and second bearings 45 and 47 that respectively support the first and second ends 20a and 20b of the worm shaft 20 are composed of a known sealed bearing. More specifically, a sealing member 63 that seals an area between an inner ring and an outer ring on both sides in the axial direction X1 of the rolling element 50 is fixed to either one of the inner ring and the outer ring. The sealing member 63 has a lip that makes sliding contact with the other ring.

Since the first and second bearings 45 and 47 that respectively support both ends of the worm shaft 20 are composed of a sealed bearing, a lubricant such as grease within the gear housing 22 does not leak out toward the accommodation chamber 100 that contains the ECU 12. In order to enhance sealing properties within the accommodation chamber 100, a liquid packing may be interposed between the screw section on the other periphery of the main body 52a in the fixing member 52 and a screw section that is screwed thereinto, for example.

In the present embodiment, a brushless motor is used as the electric motor 18. The electric motor 18 includes the motor housing 25, and a rotor 64 and a stator 65 that are housed in the motor housing 25.

The rotor 64 includes an annular rotor core 66 attached to the outer periphery of the rotatable shaft 37 together rotatably, and a rotor magnet 67 composed of an annular permanent magnet, for example, attached to the outer periphery of the rotor core 66 together rotatably. The rotor magnet 67 has a plurality of magnetic poles arranged in its circumferential direction. The N and S poles are alternately switched in the circumferential direction of the rotor 64.

The stator 65 is fixed to the inner periphery of the motor housing main body 26 in the motor housing 25. The stator 65 includes a stator core 68 fixed to the inner periphery of the motor housing main body 26 and a plurality of coils 69. The stator core 68 includes an annular yoke, and a plurality of teeth projecting radially inward from the inner periphery of the yoke. The coils 69 are respectively wound around the corresponding teeth.

A bus bar 71 having an annular shape or a C shape is housed within a motor chamber 70 that is defined by the motor housing main body 26 in the motor housing 25 and the first housing 23. The coils 69 respectively wound around the teeth 69 are connected to the bus bar 71. The bus bar 71 is a conductive connection member used for a connection of each of the coils 69 and a current application line. The bus bar 71 functions as a power distribution member for distributing power from a power supply source (not illustrated) among the coils 69.

A rotational position detection device 72 for detecting the rotational position of the rotor 64 is housed within the motor chamber 70 that is defined by the motor housing main body 26 in the motor housing 25 and the first housing 23. The rotational position detection device 72 includes a stator 73 fixed to the first housing 23 and a rotor 74 attached to the rotatable shaft 37 together rotatably. A resolver, for example, can be used as the rotational position detection device 72. A Hall element can also be used.

The rotational position detection device 72 may be arranged between the rotor core 66 in the rotor 64 in the electric motor 18 and the second housing 24. Therefore, the rotational position detecting sensor 72 may be arranged within the motor chamber 70, as in the present embodiment, or may be arranged in a cylindrical section 89, described below, provided at the center of the first housing 23 that defines the accommodation chamber 100 that contains the ECU 12.

Referring to FIG. 4, the rotatable shaft 37 is rotatably supported by a third bearing 75 and a fourth bearing 76 that are held by the first housing 23 shared by a part of the motor housing 25 and a part of the control housing H for housing the ECU 12. The third and fourth bearings 75 and 76 are composed of a sealed bearing having the same configuration as that of the first and second bearings 45 and 47.

The first housing 23 that is a part of the control housing H that partitions the accommodation chamber 100 that contains the ECU 12 includes as a bottom wall a partition wall 77 that separates the accommodation chamber 100 and the motor chamber 70. The partition wall 77 is provided with the first interior wall surface 101. A cylindrical projection 104 extends toward the motor housing main body 26 from the vicinity of the outer periphery of the partition wall 77, and one end of the motor housing main body 26 is fitted in the outer periphery of the cylindrical projection 104.

The partition wall 77 has a holding hole 105 for holding an outer ring in the third bearing 75. A cylindrical projection 106 extending toward the motor housing main body 26 from the partition wall 77 is formed coaxially with the holding hole 105. The cylindrical projection 106 has a smaller diameter than that of the cylindrical projection 104 that engages with the motor housing main body 26. The stator 73 in the rotational position detection device 72 is fixed to the inner periphery of the cylindrical projection 106.

The cylindrical section 89 extending toward the second housing 24 from the partition wall 77 is formed coaxially with the holding hole 105. An outer ring in the fourth bearing 76 is held in the inner periphery of the cylindrical section 89. An annular flange 107 extending radially inward is provided to extend at one end of the cylindrical section 89. One end of the outer ring in the fourth bearing 76 abuts on the annular flange 107 so that the axial movement of the outer ring in the fourth bearing 76 relative to the cylindrical section 89 is regulated.

On the other hand, an inner ring in the fourth bearing 76 is sandwiched between an annular positioning step formed on the outer periphery of the rotatable shaft 37 and an end surface of the input member 39 in the joint 38 so that the axial movement of the inner ring in the fourth bearing 76 relative to the rotatable shaft 37 is regulated.

A power substrate 78 and a control substrate 79 that constitute a part of the ECU 12 are housed and held in the accommodation chamber 100. At least a part of a power circuit for driving the electric motor 18 is mounted on the power substrate 78. A switching element such as a field effect transistor (FET) serving as a heat generation element is mounted. The bus bar 71 connected to each of the coils 69 is connected to the power substrate 78 via a bus bar terminal 80 inserted through the partition wall 77 in the first housing 23 and entering the accommodation chamber 100.

The rotational position detection device 72 is connected to the control substrate 79 via a bus bar terminal 81 inserted through the partition wall 77 in the first housing 23 and entering the accommodation chamber 100.

The input member 39 in the joint 38 includes a cylindrical section 39a that is fitted in an end of the rotatable shaft 37 in the electric motor 18 together rotatably. The control substrate 79 is arranged around the cylindrical section 39a in the input member 39. More specifically, the cylindrical section 39a is inserted through an insertion hole 79a at the center of the control substrate 79.

The control substrate 79 is arranged between the first interior wall surface 101 in the first housing 23 and the power substrate 78 in the axial direction X1 of the rotatable shaft 37 in the electric motor 18. The power substrate 78 and the control substrate 79 are spaced a predetermined distance apart from each other in the axial direction X1 of the rotatable shaft 37 in the electric motor 18.

Within the accommodation chamber 100, a housing space S1 formed between the partition wall 77 in the first housing 23 and the control substrate 79 has a sufficient height in the axial direction X1 of the rotatable shaft 37 in the electric motor 18. The housing space 51 houses tall components such as a capacitor and a relay, which is not illustrated in FIG. 4, so that a space in the accommodation chamber 100 is effectively used.

Figure 5:
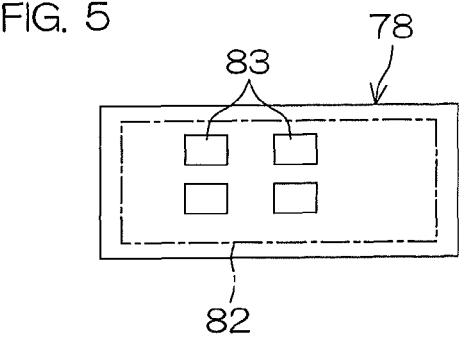
FIG. 5 is a schematic plan view of a power substrate.
Figure 6:
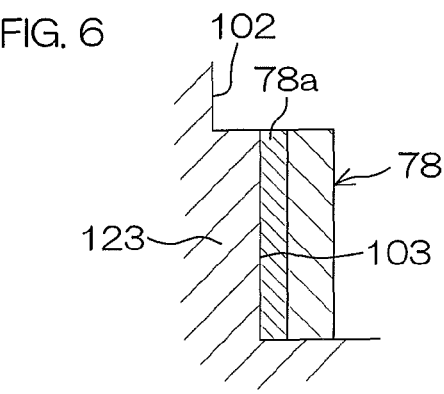
FIG. 6 is an enlarged view of a principal part of FIG. 4.

Referring to FIG. 5, a power circuit 82 for driving the electric motor 18 is mounted on the power substrate 78. The power circuit 82 mounted on the power substrate 78 includes a plurality of field effect transistors (FETs) 83 serving as heat generation elements. The power substrate 78 is composed of a multilayer substrate having a circuit mounted on its one surface. The power substrate 78 composed of the multilayer substrate includes a highly heat-conducting plate 78a composed of an aluminum plate, for example, in surface contact with the seat section 103 connecting to the heat sink 123, as illustrated in FIG. 6.

A control circuit (not illustrated) for controlling the power circuit 82 is mounted on the control substrate 79. The control circuit includes a driver for controlling each of the FETs 83 in the power circuit 82 and a central processing unit (CPU) for controlling the driver. The ECU 12 includes other non-heat generation elements such as a plurality of capacitors for removing a ripple of a current flowing through the electric motor 18 and a relay for cutting off a current flowing through the electric motor 18, as needed, which is not illustrated. The capacitors, the relay, and so on serving as the non-heat generation elements constitute a sub-assembly supported by an annular holder made of synthetic resin (not illustrated), and are collectively attached to the first housing 23.

The first housing 23 is a member in a substantially square box shape whose one end opens. More specifically, the first housing 23 includes a main body 87 having a substantially square box shape whose one end opens. The main body 87 includes an outer peripheral wall 92 having a substantially square annular shape, and the partition wall 77 serving as the bottom wall. Within the accommodation chamber 100, the cylindrical section 89 extending toward the opening side of the main body 87 (the side of the second housing 24) is formed at the center of the partition wall 77. The outer peripheral wall 92 extends from an outer peripheral edge of the partition wall 77, to surround the cylindrical section 89. The main body 87 and the cylindrical section 89 are integrally formed of a single member.

Figure 7:
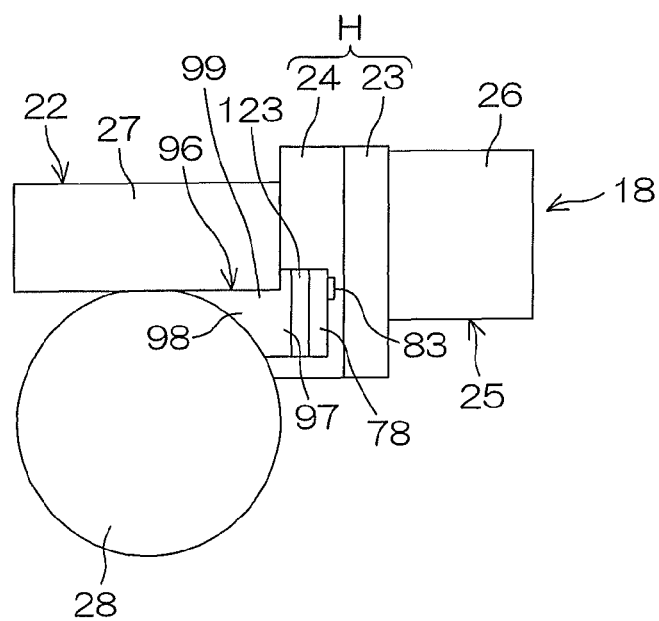
FIG. 7 is a schematic side view of a principal part of an electric power steering apparatus.

Referring to FIG. 7 that is a schematic side view, a driving gear housing 27 and a driven gear housing 28, which serve as adjacent housings, are opposite to the electric motor 18 with the control housing H sandwiched therebetween. More specifically, the driving gear housing 27 and the driven gear housing 28, which serve as adjacent housings, are adjacent to and opposite to the electric motor 18 with respect to the control housing H. A heat-conducting member 96 is provided between the driven gear housing 28 serving as the adjacent housing and the control housing H.

The heat-conducting member 96 includes a proximity section 97 in close proximity to the power substrate 78 having the FET 83 serving as the heat generation element mounted thereon so that heat can be conducted, a connected section 98 that is connected to the driven gear housing 28 serving as the adjacent housing so that heat can be conducted, and a connected section 99 that is connected to the driving gear housing 27 serving as the adjacent housing so that heat can be conducted.

A member having a high coefficient of thermal conductivity, such as aluminum or copper, is used as the heat-conducting member 96. When aluminum is used as the heat-conducting member 96, the heat-conducting member 96 and the driven gear housing 28 serving as the adjacent housing can be integrally formed of a single material. In this case, a connection portion between the second housing 24 in the control housing H and the driven gear housing 28 is a thick-walled portion, and the thick-walled portion forms the heat-conducting member 96.

A heat pipe, and a heat-conducting structural material using a heat pipe (e.g., a heat lane obtained by folding the heat pipe) can also be used as the heat-conducting member 96. The heat-conducting member 96 can have the connected section 99 that is connected to the driving gear housing 27 serving as the adjacent housing so that heat can be conducted, as illustrated in FIG. 7.

The seat section 103 in the second interior wall surface 102 contacts the power substrate 78 having the FET 83 serving as the heat generation element so that heat can be conducted, as described above. Therefore, heat generated by the FET 83 serving as the heat generation element is released toward the driven gear housing 28 or the driving gear housing 27 serving as the adjacent housings from the power substrate 78 via the heat sink 123 and the heat-conducting member 96.

According to the present embodiment, the first housing 23 serving as at least a part of the motor housing 25 and the second housing 24 that contacts the first housing 23 constitute the control housing H, to form the accommodation chamber 100 that contains the ECU 12. More specifically, no other housing is interposed between the first housing 23 and the second housing 24, to achieve miniaturization.

The heat from the FET 83 serving as the heat generation element in the ECU 12 is radiated via the heat-conducting member 96 to not the motor housing 25 in the electric motor 18 that tends to generate heat but the driven gear housing 28 serving as the adjacent housing that is adjacent to and opposite to the electric motor 18, thereby enabling heat radiation properties to be significantly improved. Therefore, the heat sink 123 can be miniaturized, and thus the electric power steering apparatus 1 can be made small in size and can have superior heat radiation properties.

The second interior wall surface 102 in the second housing 24 that partially partitions the accommodation chamber 100 includes the annular plane that is perpendicular to the central axis C1 of the rotatable shaft 37 in the electric motor 18 (or the extension C2 of the central axis C1) and surrounds the central axis C1 (or the extension C2). The heat sink 123 can be miniaturized, as described above. Therefore, the amount of projection of the flat seat section 103 provided to project from the annular plane to form the heat sink 123 into the accommodation chamber 100 is very small. More specifically, there is no unnecessary protrusion into the accommodation chamber 100 in the axial direction X1 of the rotatable shaft 37 in the electric motor 18. Even if the accommodation chamber 100 is small in size in the axial direction X1, a sufficient inner volume can be ensured as the accommodation chamber 100. As a result, the electric power steering apparatus 1 can be made as small in size as possible.

The electric power steering apparatus 1 has the following advantages because the second housing 24 is the gear housing 22 that houses the speed reduction mechanism 19 serving as the transmission mechanism for transmitting power of the electric motor 18 to the steering mechanism 4. More specifically, the ECU 12 usually includes the heat generation element such as the switching element (FET 83) mounted on the power substrate 78 as in the present embodiment. On the other hand, the speed reduction mechanism 19 hardly generates heat. The heat from the heat generation element can be effectively released from the interior of the accommodation chamber 100 to the outside via the gear housing 22 that houses the speed reduction mechanism 19.

An extension surface P1 of the seat section 103 that projects from the annular plane included in the second interior wall surface 102 contacts, as illustrated in FIG. 4, or intersects the cylindrical surface P2 formed of a principal part of the outer peripheral surface 28a of the driven gear housing 28 serving as a cylindrical section surrounding a shaft for transmitting a steering force (corresponding to the steering shaft 6 in the present embodiment). Therefore, the accommodation chamber 100 is arranged sufficiently closer to the steering shaft 6 in the axial direction X1 of the rotatable shaft 37 in the electric motor 18. Therefore, the electric power steering apparatus 1 can be made more smaller in size in the axial direction X1 of the rotatable shaft 37.

The shaft for transmitting the steering force is not limited to the above-mentioned steering shaft 6. It may be the pinion shaft 13 or the rack shaft 14 in the rack-and-pinion mechanism serving as the steering mechanism 4. In the former case, a cylindrical surface formed of a principal part of an outer peripheral surface of a cylindrical pinion housing (not illustrated) surrounding the pinion shaft 13 and the extension surface P1 intersect or contact each other. In the latter case, a cylindrical surface formed of a principal part of an outer peripheral surface of a cylindrical rack housing (not illustrated) surrounding the rack shaft 14 and the extension surface P1 intersect or contact each other.

The ECU 12 serving as the control device is arranged around the central axis C1 of the rotatable shaft 37 in the electric motor 18 or the extension C2 of the central axis C1. Therefore, the inner space of the accommodation chamber 100 can be effectively used to arrange the ECU 12, and thus the electric power steering apparatus 1 can be made smaller in size in the axial direction X1 of the rotatable shaft 37.

Figure 8:
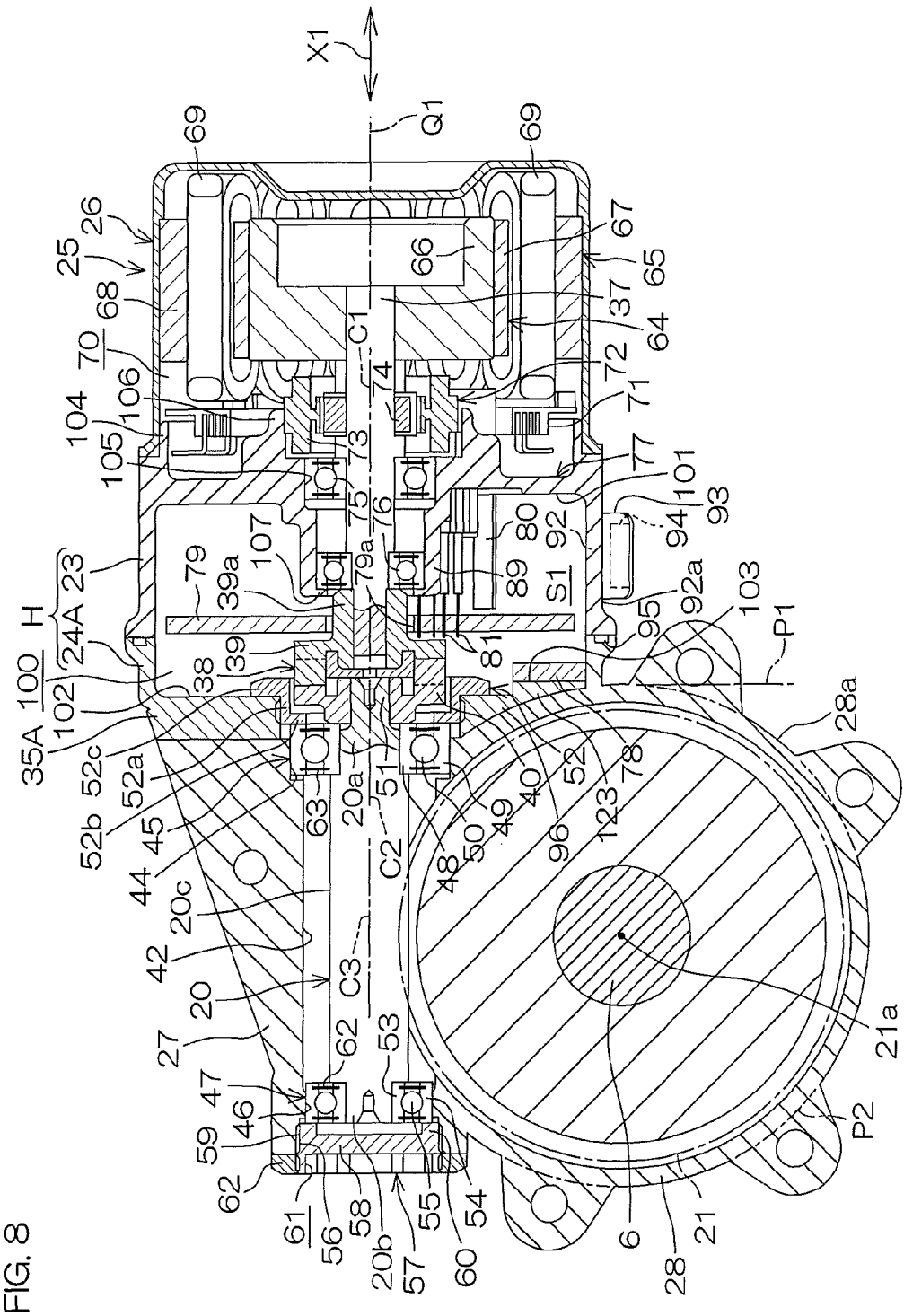
FIG. 8 is an illustrative sectional view of a steering assist mechanism in an electric power steering apparatus serving as a vehicle steering apparatus according to another embodiment of the present invention.

Although in the above-mentioned embodiment, the second housing 24 and the gear housing 22 are combined with each other, the present invention is not limited to the same. As illustrated in FIG. 8, a second housing 24A and a sensor housing 35A may be combined with each other. More specifically, the second housing 24A is formed of a single material integrally with the sensor housing 35A. In this case, heat from a heat generation element such as an FET 83 can be effectively released from the interior of an accommodation chamber 100 to the outside via the sensor housing 35A serving as an adjacent housing that houses a torque sensor 11 serving as a steering state detecting sensor. In FIG. 8, the same components as those illustrated in FIG. 4 are respectively assigned the same reference numerals.

A housing that houses a steering angle sensor serving as a steering state detecting sensor for detecting the steering angle of a steering wheel 2 and the second housing 24A may be combined with each other, which is not illustrated.

Figure 9:
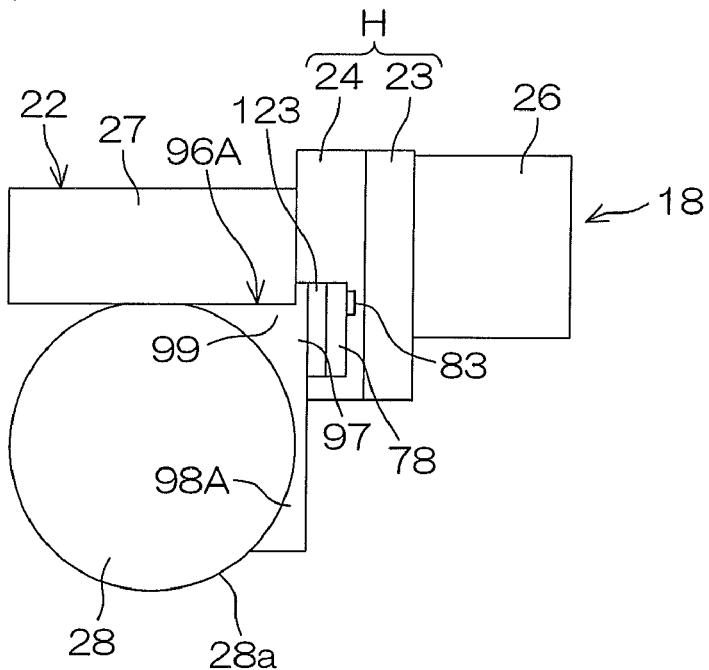
FIG. 9 is a schematic side view of a principal part of an electric power steering apparatus serving as a vehicle steering apparatus according to still another embodiment of the present invention.
Figure 10:
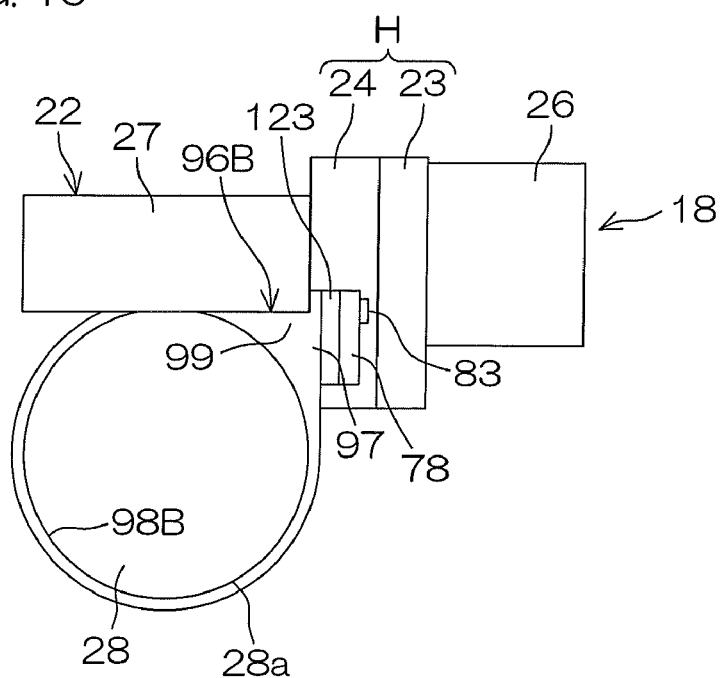
FIG. 10 is a schematic side view of a principal part of an electric power steering apparatus serving as a vehicle steering apparatus according to still another embodiment of the present invention.

If a heat-conducting member 96A includes a connected section 98A that extends along a part of an outer peripheral surface 28a of a driven gear housing 28 serving as an adjacent housing, as illustrated in FIG. 9, a wide area of heat conduction can be ensured, thereby enabling heat radiation properties to be further enhanced. Particularly if a heat-conducting member 96B includes a connected section 98B that extends along the substantially whole periphery of an outer peripheral surface 28a of a driven gear housing 28 serving as an adjacent housing, as illustrated in FIG. 10, heat conduction properties and heat radiation properties can be further enhanced.

Figure 11:
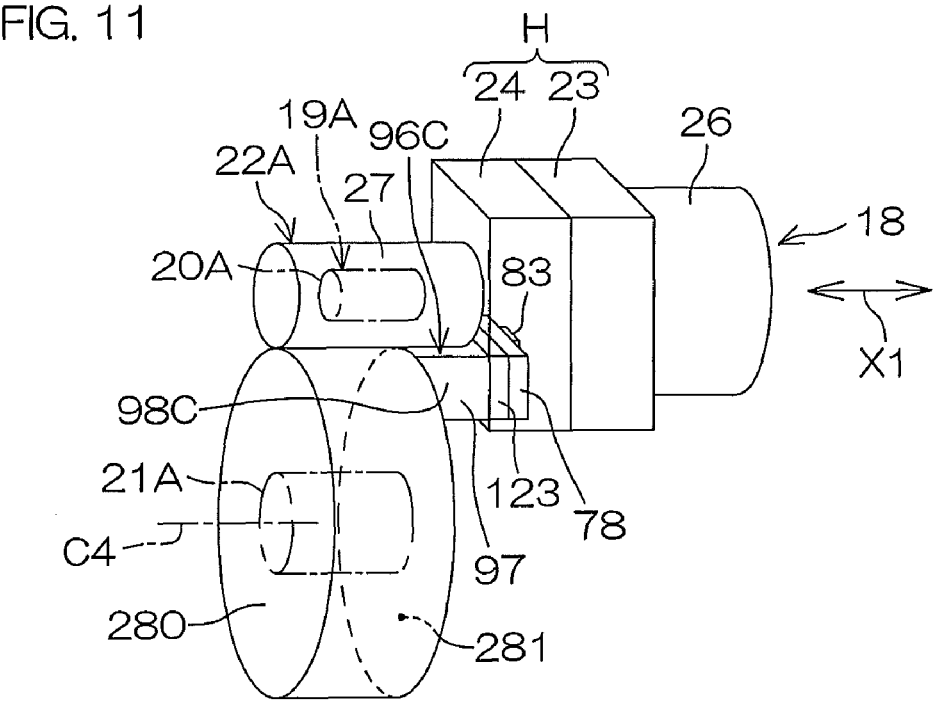
FIG. 11 is a schematic side view of a principal part of an electric power steering apparatus serving as a vehicle steering apparatus according to still another embodiment of the present invention.

In an embodiment illustrated in FIG. 11, a speed reduction mechanism 19A serving as a transmission mechanism includes a driving member 20A and a driven member 21A, and the driven member 21A is not a worm wheel but a helical gear having a central axis C4 parallel to an axial direction X1 of a rotatable shaft 37 in an electric motor 18. In this case, a driven gear housing 280 in a gear housing 22A is a cylindrical housing centered around the central axis C4 of the driven member 21A.

A proximity section 97 in a heat-conducting member 96C is in close proximity to a heat sink 123, and a connected section 98C in the heat-conducting member 96C is connected to an end surface 281 of the driven gear housing 280 serving as an adjacent housing so that heat can be conducted.

Figure 12:
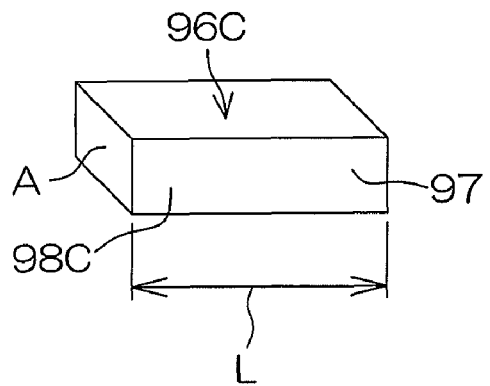
FIG. 12 is a schematic perspective view of a heat-conducting member.

The heat-conducting member 96C extends in a predetermined length L (m) toward the driven gear housing 280 serving as the adjacent housing from a second housing 24 in a control housing H, i.e., in a direction parallel to the axial direction X1 of the rotatable shaft 37 in the electric motor 18 and has a uniform cross-sectional area A (m²) (see FIG. 12).

Letting ρ (W/mK) be the coefficient of thermal conductivity of the heat-conducting member 96C and B (W/10° C.) be the average loss of a heat generation element, the following equation (1) holds:

$$(A^2/L) < (1/\rho) \cdot B \qquad (1)$$

In this case, the cross-sectional area A and the length L of the heat-conducting member 96C can be designed to optimum set values at which sufficient heat conduction and heat radiation can be exhibited.

Figure 13:
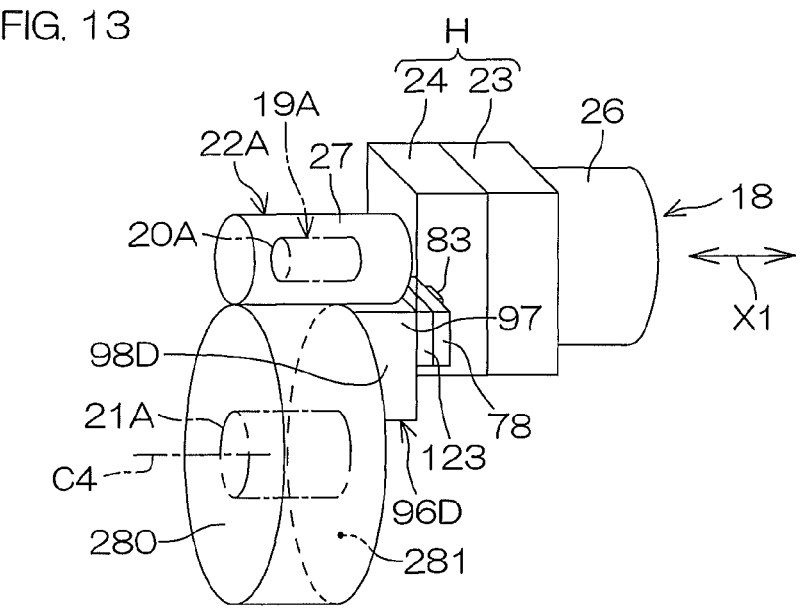
FIG. 13 is a schematic side view of a principal part of an electric power steering apparatus serving as a vehicle steering apparatus according to still another embodiment of the present invention.
Figure 14:
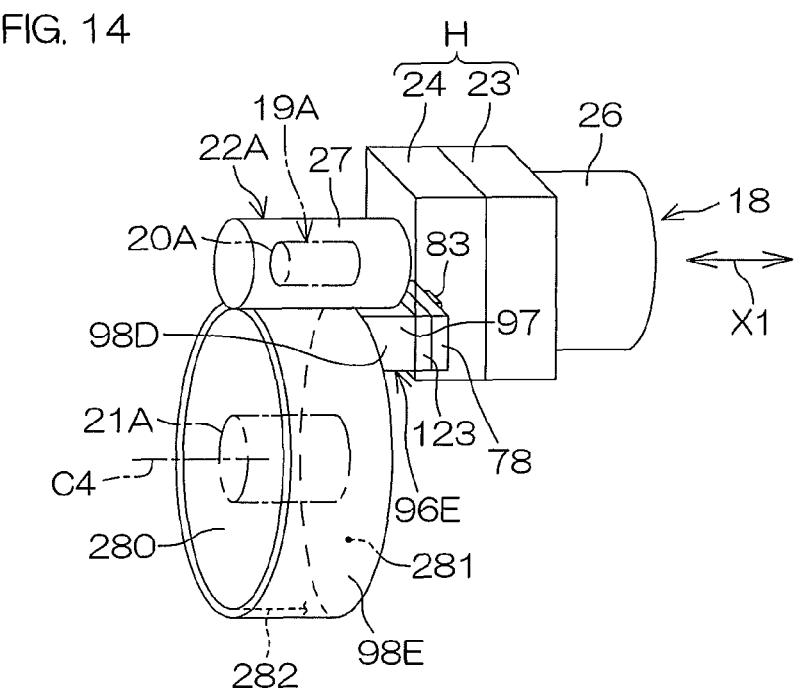
FIG. 14 is a schematic side view of a principal part of an electric power steering apparatus serving as a vehicle steering apparatus according to still another embodiment of the present invention.

If a connected section 98D in a heat-conducting member 96D extends along a part of an end surface 281 of a driven gear housing 280 serving as an adjacent housing, as illustrated in FIG. 13, a wide area of heat conduction can be ensured, thereby enabling heat radiation properties to be further enhanced. Particularly if a heat-conducting member 96E includes a connected section 98D along a part of an end surface 281 of a driven gear housing 280 serving as an adjacent housing and a connected section 98E extending along the substantially whole periphery of an outer peripheral surface 282 of the driven gear housing 280 serving as an adjacent housing, as illustrated in FIG. 14, heat conduction properties and heat radiation properties can be further enhanced.

The present invention is not limited to the contents of the above-mentioned embodiments. Various changes can be made. Although in the above-mentioned embodiments, the present invention is applied to an electric power steering apparatus of a so-called column assist type, the present invention is not limited to the same. For example, the present invention may be applied to an electric power steering apparatus of a so-called pinion assist type or an electric power steering apparatus of a so-called rack assist type.

Although in the above-mentioned embodiments, the present invention is applied to the electric power steering apparatus for outputting power of the electric motor as the steering assist force, the present invention is not limited to the same. For example, the present invention may be applied to a vehicle steering apparatus of a transmission ratio variable type including a transmission ratio variable mechanism capable of changing the ratio of the steering angle of a steerable wheel to the steering angle of a steering member and using an output of an electric motor to drive the transmission ratio variable mechanism, and a vehicle steering apparatus of a steer-by-wire type in which mechanical connection between a steering member and a steerable wheel is released to steer the steerable wheel at an output of an electric motor.

At least a part of the power substrate 78 and the control substrate 79 in the ECU 12 may be molded of resin.

Although in the above-mentioned embodiments, a blushless motor is used as the electric motor 18, the present invention is not limited to the same. A motor other than the blushless motor may be used as the electric motor 18.

While the invention has been described in detail with respect to specific embodiments thereof, it will be appreciated that those skilled in the art, upon attaining an understanding of the foregoing, may readily conceive of alternations to, variations of, and equivalents to these embodiments. Accordingly, the scope of the present invention should be assessed as that of the appended claims and any equivalents thereto.

This application claims priority from Japanese Patent Application No. 2008-31109 filed with the Japanese Patent Office on Feb. 12, 2008, the disclosure of which is hereinto incorporated by reference.

The invention claimed is:

1. A vehicle steering apparatus comprising:
a control device that includes a heat generation element and controls the driving of an electric motor;
a control housing that partitions an accommodation chamber that accommodates the control device;
an adjacent housing that is opposite to the electric motor with the control housing sandwiched therebetween and is adjacent to the control housing; and
a heat-conducting member, wherein
the heat-conducting member includes a proximity section in close proximity to the heat generation element of the control device so that heat can be conducted, and a connected section that is connected to the adjacent housing so that heat can be conducted,
the control housing includes first and second interior wall surfaces that are opposite to each other in an axial direction of a rotatable shaft of the electric motor, the first and second interior wall surfaces partially partition the accommodation chamber,
the first interior wall surface is arranged relatively closer to the electric motor, and the second interior wall surface is arranged relatively farther from the electric motor,
the heat generation element of the control device is mounted on a power substrate attached to the second interior wall surface so that heat can be conducted, and
the proximity section of the heat-conducting member is connected to a heat sink connected to the second interior wall surface so that heat can be conducted.

2. The vehicle steering apparatus according to claim 1, further comprising
a transmission mechanism housing that houses a transmission mechanism for transmitting power of the electric motor to a steering mechanism,
wherein the adjacent housing includes a housing provided in the transmission mechanism housing.

3. The vehicle steering apparatus according to claim 2, wherein
the transmission mechanism includes a driving member and a driven member that is driven by the driving member,
the transmission mechanism housing includes a cylindrical driven member housing that houses the driven member, and
the connected section of the heat-conducting member is along at least one of an outer peripheral surface and an end surface of the driven member housing.

4. The vehicle steering apparatus according to claim 1, wherein at least a part of the heat-conducting member is arranged between the control housing and the adjacent housing.

5. The vehicle steering apparatus according to claim 1, wherein the control device is arranged around a central axis of the rotatable shaft of the electric motor or an extension of the central axis.

6. A vehicle steering apparatus comprising:
a control device that includes a heat generation element and controls the driving of an electric motor;
a control housing that partitions an accommodation chamber that accommodates the control device;
an adjacent housing that is opposite to the electric motor with the control housing sandwiched therebetween and is adjacent to the control housing;
a heat-conducting member; and
a steering state detecting sensor for detecting a steering state, wherein
the heat-conducting member includes a proximity section in close proximity to the heat generation element of the control device so that heat can be conducted, and a connected section that is connected to the adjacent housing so that heat can be conducted, and
the adjacent housing includes a sensor housing that houses the steering state detecting sensor.

7. The vehicle steering apparatus according to claim 6, wherein a part of the control housing and the sensor housing are integrally formed of a single material.

8. A vehicle steering apparatus comprising:
a control device that includes a heat generation element and controls the driving of an electric motor;
a control housing that partitions an accommodation chamber that accommodates the control device;
an adjacent housing that is opposite to the electric motor with the control housing sandwiched therebetween and is adjacent to the control housing; and a heat-conducting member, wherein
the heat-conducting member includes a proximity section in close proximity to the heat generation element of the control device so that heat can be conducted, and a connected section that is connected to the adjacent housing so that heat can be conducted,
the heat-conducting member includes a member that extends in a predetermined length toward the adjacent housing from the control housing, and
letting A be the cross-sectional area of the member extending in the predetermined length L, ρ be the coefficient of thermal conductivity of the member extending in the predetermined length L, and B be the average loss of the heat generation element, the following equation holds:

$$(A2/L) < (1/p) \cdot B.$$

9. A vehicle steering apparatus comprising:
a control device that includes a heat generation element and controls the driving of an electric motor;
a control housing that partitions an accommodation chamber that accommodates the control device;
an adjacent housing that is opposite to the electric motor with the control housing sandwiched therebetween and is adjacent to the control housing; and
a heat-conducting member, wherein
the heat-conducting member includes a proximity section in close proximity to the heat generation element of the control device so that heat can be conducted, and a connected section that is connected to the adjacent housing so that heat can be conducted,
the control housing includes first and second interior wall surfaces that are opposite to each other in an axial direction of a rotatable shaft of the electric motor,
the first and second interior wall surfaces partially partition the accommodation chamber,
the first interior wall surface is arranged relatively closer to the electric motor, and the second interior wall surface is arranged relatively farther from the electric motor, and
the heat generation element of the control device is mounted on a power substrate attached to the second interior wall surface so that heat can be conducted.

10. A vehicle steering apparatus comprising:
a control device that includes a heat generation element and controls the driving of an electric motor;
a control housing that partitions an accommodation chamber that accommodates the control device;
an adjacent housing that is opposite to the electric motor with the control housing sandwiched therebetween and is adjacent to the control housing; and
a heat-conducting member, wherein
the heat-conducting member includes a proximity section in close proximity to the heat generation element of the control device so that heat can be conducted, and a connected section that is connected to the adjacent housing so that heat can be conducted,
the control housing includes first and second interior wall surfaces that are opposite to each other in an axial direction of a rotatable shaft of the electric motor,
the first and second interior wall surfaces partially partition the accommodation chamber,
the first interior wall surface is arranged relatively closer to the electric motor, and the second interior wall surface is arranged relatively farther from the electric motor, and
the proximity section of the heat-conducting member is connected to a heat sink connected to the second interior wall surface so that heat can be conducted.

* * * * *